United States Patent
Pernick

[11] Patent Number: 5,921,501
[45] Date of Patent: Jul. 13, 1999

[54] AIRCRAFT ICE DETECTING SYSTEM

[75] Inventor: Benjamin J. Pernick, Forest Hills, N.Y.

[73] Assignee: Northrop Grumman Corporation, Los Angeles, Calif.

[21] Appl. No.: 08/446,976

[22] Filed: May 22, 1995

Related U.S. Application Data

[63] Continuation-in-part of application No. 08/092,241, Jul. 14, 1993, abandoned.

[51] Int. Cl.$^6$ .................................................. B64D 15/20
[52] U.S. Cl. ........................ 244/134 F; 340/583; 340/962
[58] Field of Search ........................... 244/134 R, 134 F; 340/962, 581, 583; 73/170 R; 364/563; 250/339, 341; 356/382

[56] References Cited

U.S. PATENT DOCUMENTS

| | | |
|---|---|---|
| 4,274,091 | 6/1981 | Decker . |
| 4,593,533 | 6/1986 | Alsenz . |
| 4,690,553 | 9/1987 | Fukamizu et al. . |
| 4,996,430 | 2/1991 | Gupta . |
| 5,180,122 | 1/1993 | Christian et al. . |
| 5,218,206 | 6/1993 | Schmitt et al. . |
| 5,243,185 | 9/1993 | Blackwood . |
| 5,296,853 | 3/1994 | Federow et al. . |
| 5,400,144 | 3/1995 | Gagnon ............................ 244/134 F |

*Primary Examiner*—Galen L. Barefoot
*Attorney, Agent, or Firm*—Terry J. Anderson; Karl J. Hoch, Jr.

[57] ABSTRACT

In a method of detecting ice on surfaces of an aircraft, a surface of an aircraft is scanned with laser light operating at different wavelength regions in a manner whereby the surface scatters the laser light. Laser light scattered from the surface is detected. Radiation outside the wavelength bands of interest is removed prior to detection. The detected, filtered, scattered laser light is processed to reconstruct images of the surface, thereby indicating areas of ice and water on the surface. The processing takes into account the directions of scanned continuous wattage laser beams relative to the surface, laser beam geometry factors due to changing distance between the laser beams and the surface while scanning, relative signal levels, normalizations and returns from other detectors. The material of the windows of the aircraft blocks the laser beam and any stray laser light. Also, the windows of the aircraft could be treated to block the laser beam and the laser light. Areas of ice and water on the surface indicated by the processing are visually displayed.

15 Claims, 10 Drawing Sheets

AIRCRAFT ICE DETECTING SYSTEM

CROSS-REFERENCE TO RELATED APPLICATIONS

This application is a continuation-in-part of application U.S. Ser. No. 08/092,241, filed Jul. 14, 1993, now abandoned.

BACKGROUND OF THE INVENTION

1. Field of the Invention

The present invention relates to an aircraft ice detecting system. More particularly, the invention relates to an aircraft ice detecting system including novel laser imaging and visual display technologies.

The formation of ice on key aircraft structures is a significant hazard for a safe takeoff. An accumulation of even small thicknesses of rough ice covering significantly wide areas of wing, tail surfaces and leading wing edges can disrupt proper airflow across lift surfaces, potentially leading to catastrophes upon takeoff. Although aircraft are deiced using special deicing fluids, significant time delays between the application of deicing fluids and takeoff can permit ice to reform. It is important, therefore, to provide means and methods whereby flight worthiness may be determined immediately prior to takeoff.

2. Discussion of Prior Art

It is the current practice to have the flight crew visually observe the aircraft wings and possible formations of ice thereon from the cockpit and/or the passenger cabin windows. Unfortunately, this technique is understandably imprecise and has proven to be inadequate on numerous occasions, at times leading to serious or even fatal accidents.

In the near past and also at present, so-called, "hands on" inspections of critical surfaces by ground personnel has been and still is required during the sequence of aircraft preparation events prior to takeoff. While this method provides only marginal increases in the quality or thoroughness of detection of any potential hazards to the aircraft, it is subject to serious additional deficiencies. One of these deficiencies resides in the need to position an inspector on a vehicle in proximity to the aircraft, including the engine intake thereof. Having an inspector in a vehicle near an aircraft which, during the moments before takeoff, creates the potential for damaging the aircraft, causing fuel leakage and creating a fire hazard. Another drawback lies in the inverse relationship present between the accuracy of the inspector's performance and the severity of the weather conditions which adversely affects his ability to view the aircraft clearly, inasmuch as the worst weather conditions requires the most accurate and intense detection of potentially dangerous situations for the aircraft.

The principal object of this invention is, therefore, to provide a system to inspect the surfaces of an aircraft for the presence of any build-up of ice, having a simple structure, and which system functions efficiently, effectively and reliably.

A further object of the invention is to provide an aircraft ice detecting system which inspects the surfaces of an aircraft for the presence of ice from remote locations.

Another object of the invention is to provide an aircraft ice detecting system which inspects the surfaces of an aircraft for the presence of ice from a remote area at the side of a runway or from a mobile van which is remote from the aircraft taxiing or in the position thereof for takeoff.

Still another object of the invention is to provide an aircraft ice detecting system which eliminates the need for the presence of an inspector in proximity to the aircraft.

Yet another object of the invention is to provide an aircraft ice detecting system which eliminates the need for personnel to be exposed to severe weather conditions.

Another object of the invention is to provide an aircraft ice detecting system which eliminates the need for a test vehicle to come into proximity with the aircraft, thereby preventing possible damage to the aircraft by the test vehicle.

SUMMARY OF THE INVENTION

The system of the invention utilizes a laser-based detection system located in a remote area, such as a fixed site, off to the side of a runway or on a mobile van removed at a considerable distance from any aircraft proceeding along a taxiway or in position for takeoff. In addition, there is no need for an inspector to be located in proximity to the aircraft in order to accomplish the test procedure. Furthermore, any personnel would be stationed within a fixed site, or mobile van, so as to be protected from adverse weather conditions. The system of the invention functions by observing continuous wattage laser light scattered from key aircraft surfaces. As hereinafter described, a multi-wavelength system is used to distinguish between ice surfaces and surfaces which are amply protected by deicing fluid.

In accordance with the invention, a method of detecting the presence of ice on surfaces of an aircraft comprises the steps of scanning a surface of an aircraft with a continuous wattage laser beam in a manner whereby the surface scatters the laser beam, detecting laser light scattered by the surface, and processing the detected scattered laser light to reconstruct images of the surface, thereby indicating area of ice and water on the surface.

Radiation outside the wavelength bands of interest is eliminated after scanning the surface with one or more laser beams and just prior to detection. The processing takes into consideration the directions of scanned laser beams relative to the surface, laser beam geometry factors due to changing distance between the laser beams and the surface while scanning, relative signal levels, normalizations and returns from other detector means.

Areas of ice present on the surface which are indicated by the processing are visually displayed. The aircraft normally possesses windows and the material of the windows blocks the laser beam and any stray laser light. Also, the windows of the aircraft could be treated to block the laser beam and the laser light.

The laser beam may have a first wavelength absorbed by either deicing fluid or water and ice and a second wavelength absorbed by the other of either deicing fluid or water and ice.

In accordance with the invention, a method of detecting ice on surfaces of an aircraft having windows comprises the steps of scanning a surface of an aircraft with a laser light in a manner whereby the surface scatters the laser light. Laser light scattered from the surface is detected. Radiation outside the wavelength bands of interest is removed prior to detection. The detected scattered laser light is processed to reconstruct images of the surface, thereby indicating areas of ice and water on the surface, the processing taking into consideration the directions of scanned laser beams relative to the surface, laser beam geometry factors due to changing distance between the laser beams and the surface while scanning, relative signal levels, normalizations and returns from other detector means. The material of the windows or the aircraft blocks the laser beam and any stray laser light. Areas of ice and water on the surface indicated by the processing are visually displayed.

In accordance with the invention, an aircraft ice detecting system for detecting the presence of ice on surfaces of an aircraft comprises laser means for directing laser light to a surface of an aircraft in a manner whereby the surface scatters the laser light. Detector means detects laser light scattered by the surface. Processing means electrically connected to the detector means reconstructs images of the surface, thereby indicating areas of ice on the surface.

Scanning means interposed between the laser means and the aircraft forms laser beams that scan the surface. Wavelength filter means interposed prior to the detector means removes or eliminates radiation outside the wavelength bands of interest.

The processing means processes output signals of the detector means, taking into consideration the directions of the scanned laser beams relative to the surface, laser beam geometry factors due to changing distance between the laser beams and the surface while scanning, relative signal levels, normalizations and returns from other detector means.

Visual display means electrically connected to the processing means visually displays areas of ice on the surface indicated by the processing means.

The laser light directed by the laser means may have a first wavelength absorbed by either deicing fluid or ice and water and a second wavelength absorbed by the other of deicing fluid or ice and water. The detector means includes a first detector for the first wavelength and a second detector for the second wavelength.

BRIEF DESCRIPTION OF THE DRAWINGS

Other objects and features of the present invention will become apparent from the following detailed description considered in connection with the accompanying drawings which disclose an embodiment of the present invention. Wherein the drawings are for the purpose of illustration only and not as a limitation of the scope of the invention.

In the drawings; wherein similar reference characters denote similar elements throughout the several views.

DETAILED DESCRIPTION OF PREFERRED EMBODIMENTS

Figure 1:
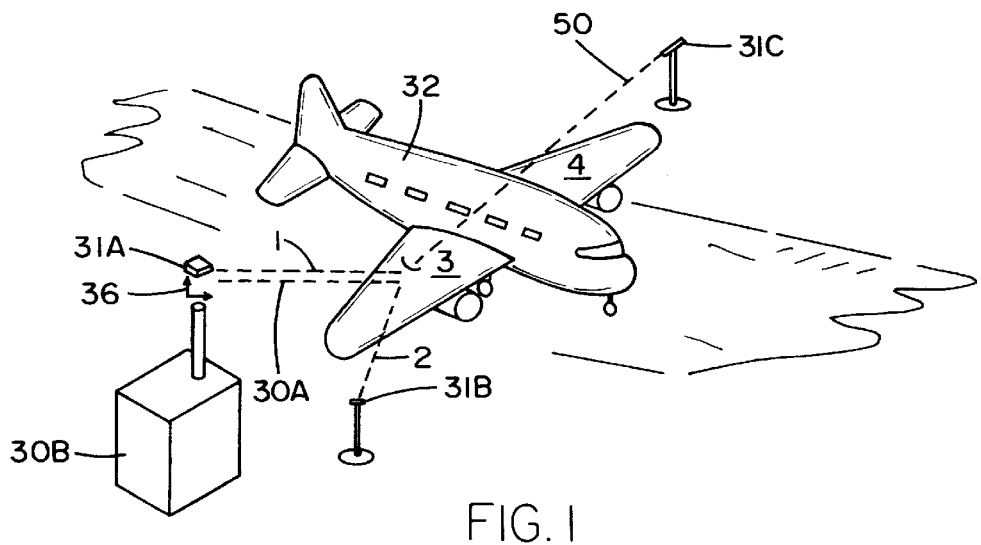
FIG. 1 is a schematic perspective diagram illustrating an embodiment of the aircraft ice detecting system of the invention.

FIG. 1 illustrates the operation of the aircraft ice detecting system of the invention. A continuous wattage laser beam 30A from a laser source 30B contained in an enclosure is scanned in two dimensions 36 and effectively sweeps across wing surfaces 3 and 4. Laser light reflected in any one of a number of ways, such as, for example, back scatter 1, forward 50 or side scatter 2, is detected at all operating wavelengths. Thus, for example, in a two wavelength system, the first laser beam radiates at a wavelength which is highly absorbed by deicing fluid, for example, but not water and ice. The second laser beam radiates at a wavelength that is absorbed in an opposite sense. Thus, with both wavelengths, the system has the ability to determine the presence or lack of rough ice and the presence, or scarcity, of deicing fluid.

Figures 2A, 2B:
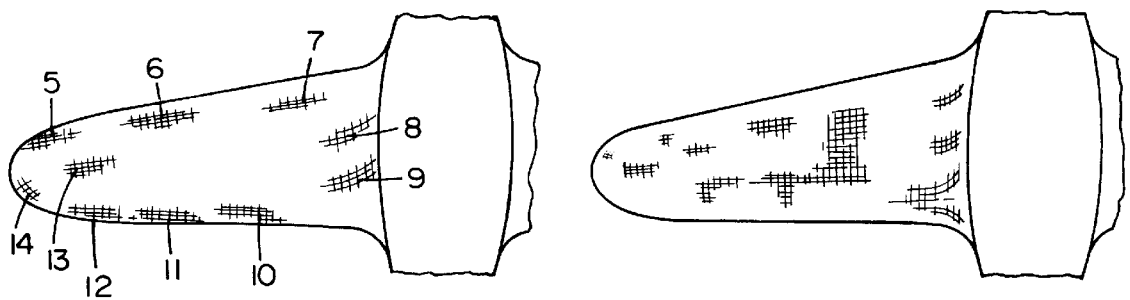
FIGS. 2A and 2B are schematic images provided by the embodiment of FIG. 1.

The scattered light at each wavelength is sensed by three detectors 31A, 31B and 31C in the example of FIG. 1, each sensitive to a specific laser wavelength. The output of each detector is transmitted to an image processing subsystem. The image processor would reconstruct images of the scanned aircraft surface from the scanned data received by the wavelength selective detectors. FIGS. 2A and 2B show the images associated with the two wavelengths. Regions 5, 6, 7, 8, 9, and so on, of one image, FIG. 2A, that appear dark due to absorption and scattering, appear light in the alternate image, FIG. 2B. If the image of FIG. 2A corresponds to the wavelength absorbed by ice and water, for example, then the dark areas 5 to 14 of FIG. 2A indicated the presence of ice and water on the aircraft wing. The image of FIG. 2B then shows how the deicing fluid is spread over the wing, since this image is derived from the light at a wavelength absorbed by the fluids.

Figure 3:
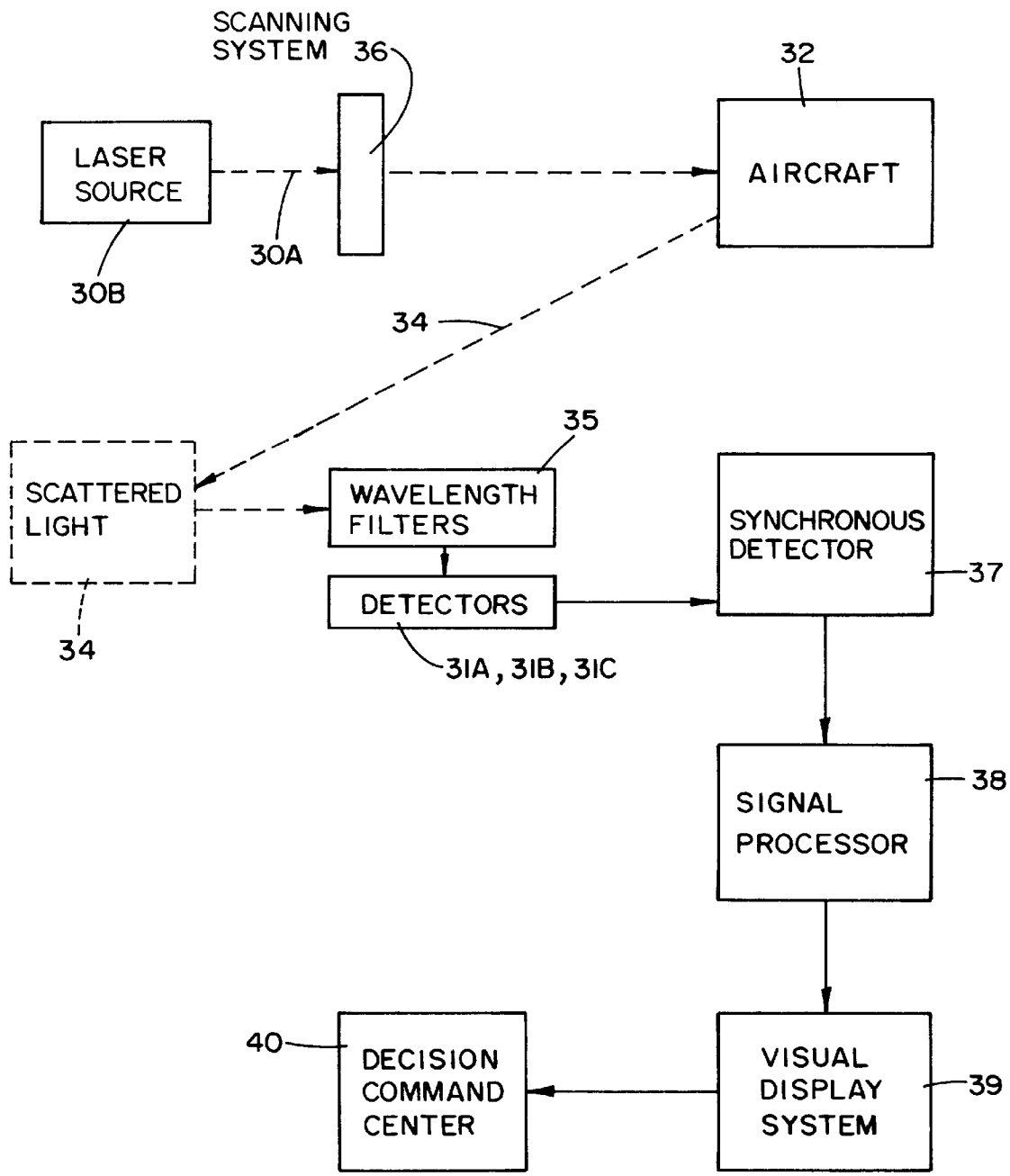
FIG. 3 is a block diagram of the embodiment of FIG. 1 of the system of the invention.

FIG. 3 illustrates the overall system operation. Laser beams 30A, from laser source 30B (FIGS. 1 and 3), either pulsed or CW, are scanned across the surfaces of aircraft 32 via a scanning system or scanner 36 (FIG. 3). Scattered or reflected laser light 34 is wavelength filtered by wavelength filters 35 of any suitable known type to remove unwanted radiation outside of the wavelength bands of interest. The scattered filtered laser light levels are then detected by detectors 31A, 31B and 31C of any suitable known type. The filters 35 remove radiation outside the wavelength bands of interest. If the laser beams are temporally modulated in intensity, frequency, pulsed or CW, for example, a sinusoidal modulation, synchronous detectors 37 of any suitable known type are used.

The output signals of the detectors 31A, 31B and 31C are then processed by a signal processor 38 of any suitable known type using dedicated computer software. The signal processor 38, takes into account, or considers, the directions of the scanned laser beams with respect to the aircraft surfaces, laser beam geometry factors due to changing distance between the laser beams and aircraft surface while scanning, relative signal levels, normalizations and returns from other detectors, if more than one detector is used (for example, bipolar operation).

Images of the aircraft surfaces 3 and 4 are reconstructed, thereby indicating areas of ice on said surfaces, and displayed by a visual display system 39 of any suitable known type. The images displayed by the visual display system 39 are available to personnel who make decisions based on evaluation of icing conditions affecting the aircraft at a decision command center 40.

Figure 4:
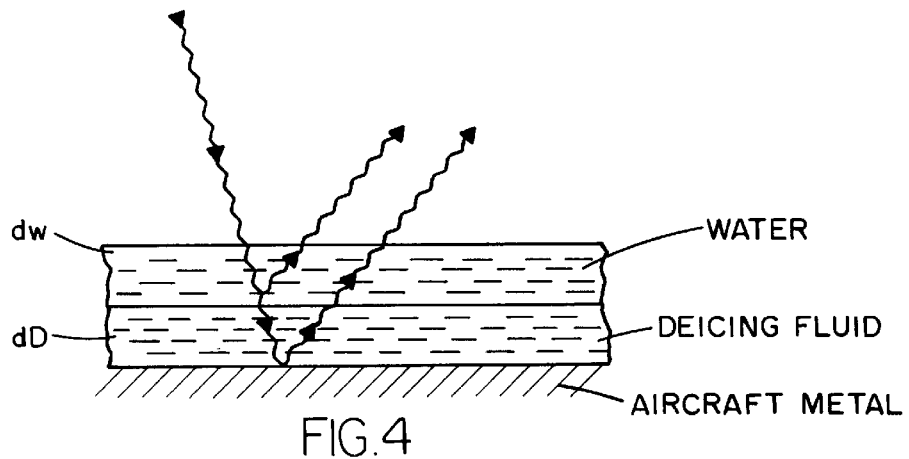
FIG. 4 is a schematic diagram, on an enlarged scale, showing laser beam illumination of, and scattered radiation from, a surface having a layer of water and a layer of deicing fluid.

A two wavelength method can be used when ice, water and deicing fluid are superimposed in a layered formation, or when the deicing fluid is mixed with water. FIG. 4 shows laser beam illumination of, and scattered radiation from, a surface having a layer of water and a layer of deicing fluid. The ordering of the layers is of no consequence.

If AW ($\lambda$) and AD ($\lambda$) are the absorption coefficients for water and deicing fluid, respectively, and if dW and dD are the respective layer thicknesses or depths, the reflected or scattered light levels R($\lambda$), at two wavelengths $\lambda_1$, and $\lambda_2$, are then given by $$\log R(\lambda_1) = -[AW(\lambda_1)*dW + AD(\lambda_1)*dD] \quad (1)$$

$$\log R(\lambda_2) = -[AW(\lambda_2)*dW + AD(\lambda_2)*dD] \quad (2)$$

Since the absorption coefficients are known a priori and as the irradiance values R($\lambda_1$) and R($\lambda_2$) are measured, Equations (1) and (2) can be solved for the thicknesses dW and dD. The relative values of these thicknesses would be used to determine the effectiveness of the deicing fluid.

Figure 5:
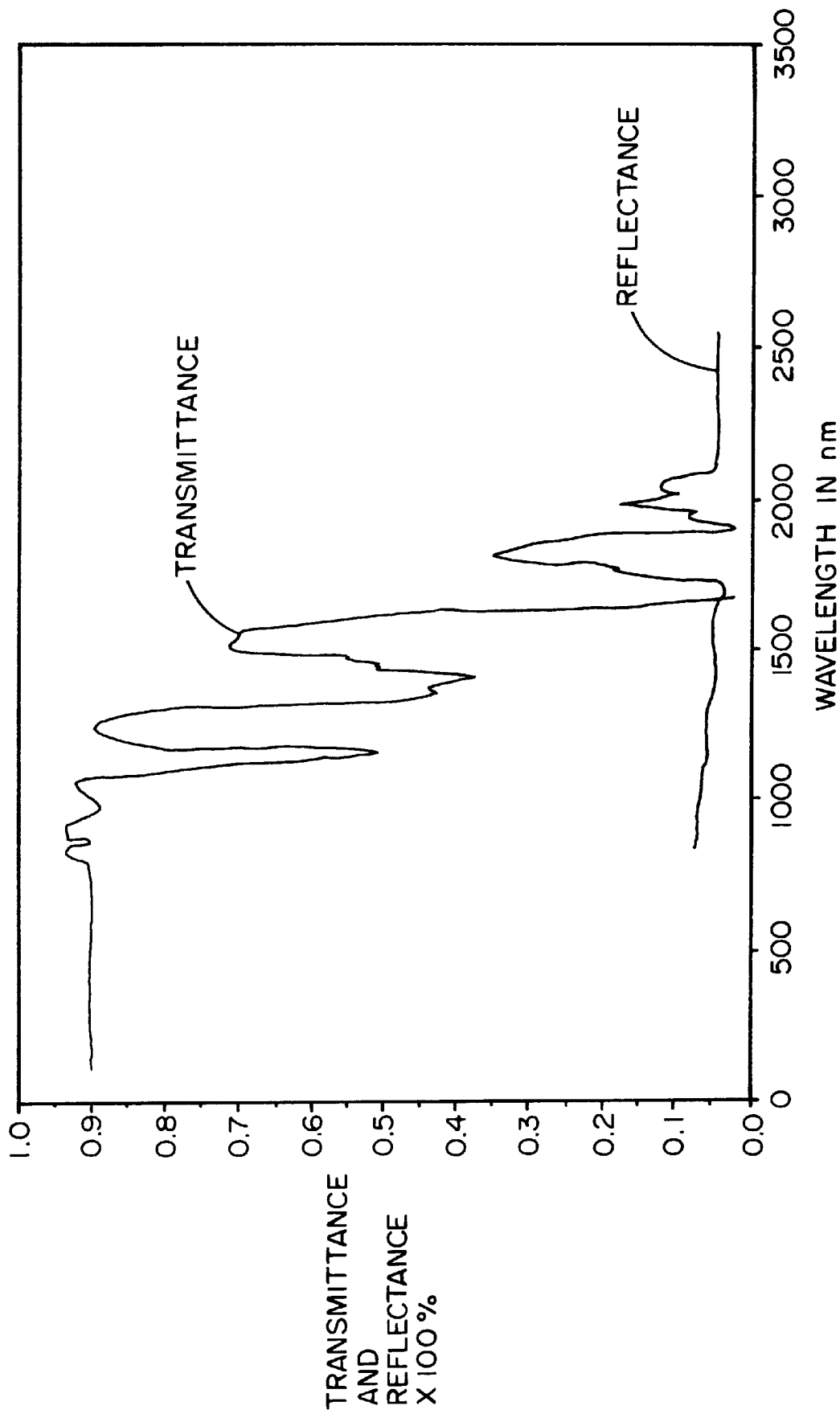
FIG. 5 is a graphical presentation of the wavelength transmittance properties of uncoated stretched acrylic.
Figure 6:
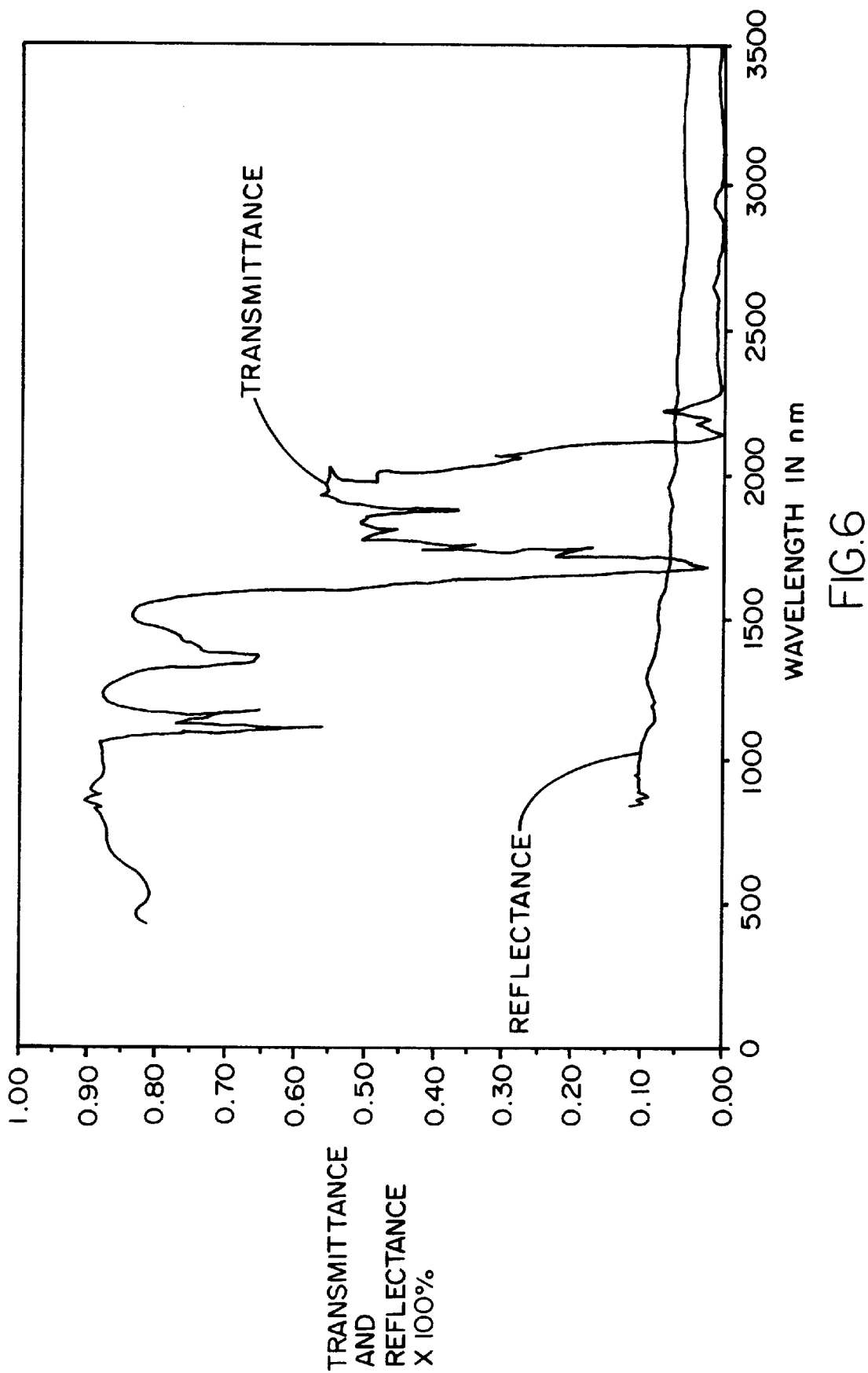
FIG. 6 is a graphical presentation of the wavelength transmittance properties of uncoated polycarbonate.
Figure 7:
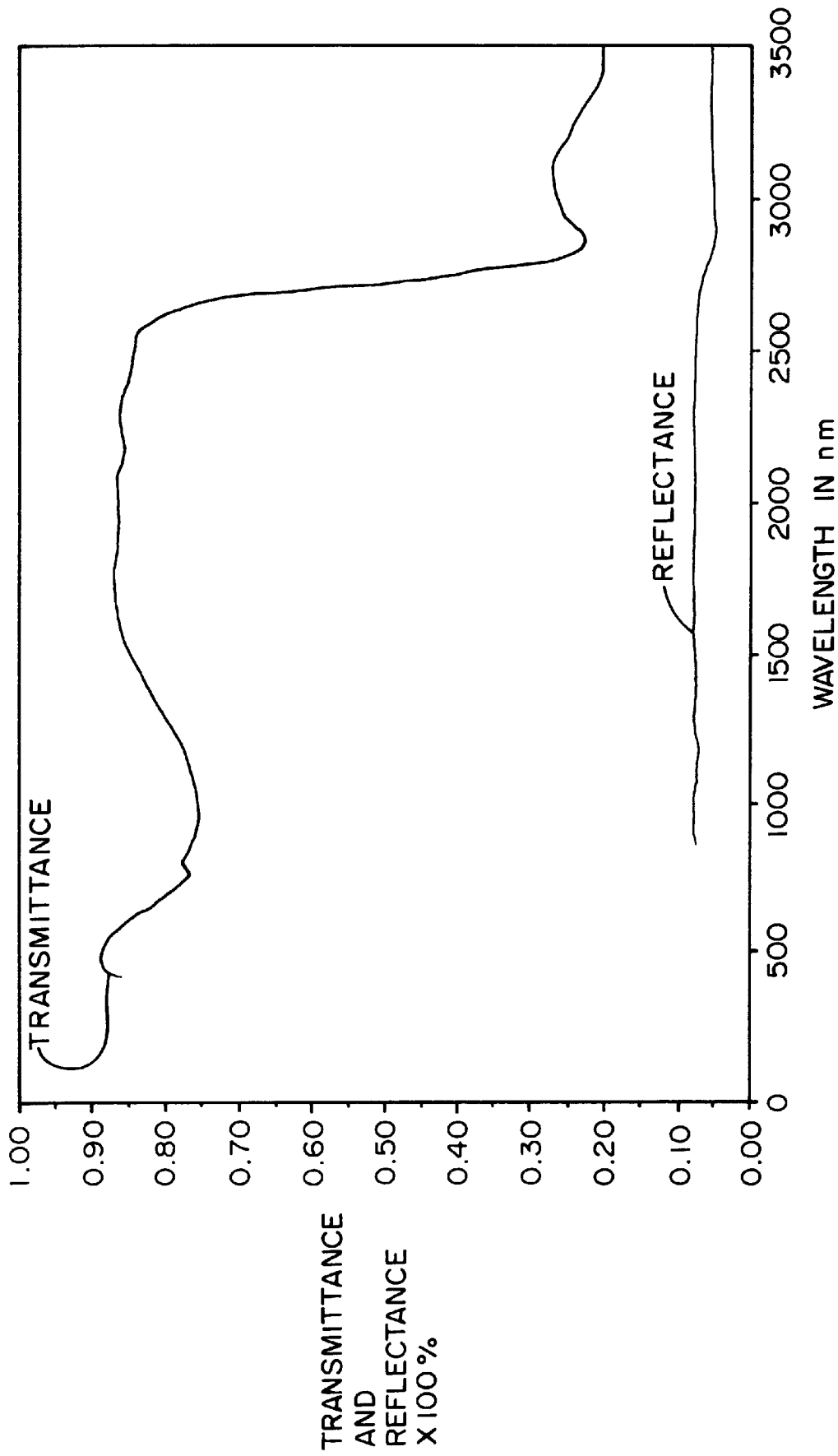
FIG. 7 is a graphical presentation of the wavelength transmittance properties of uncoated soda lime glass.

To prevent personnel and passengers on board the aircraft from being irradiated by laser light, all operating wavelengths must be safely blocked by the aircraft windows. FIGS. 5, 6 and 7 are graphical presentations of the wavelength transmission properties of three materials from which aircraft windows are constructed. In FIGS. 5 and 6, the abscissa represents laser wavelength in nanometers and the ordinate represents transmittance and reflectance times 100%. The transmittance data was obtained from 0.0250 inch thick samples in both FIGS. For the uncoated stretched acrylic (FIG. 5) the transmittance is essentially zero for wavelengths greater than 2200 nm. For the uncoated polycarbonate (FIG. 6) the cutoff wavelength is about 3000 nm. Thus, lasers radiating beyond 3000 nm are candidate choices for the aircraft ice detecting system of the invention.

FIG. 7 is a graphical presentation of the transmittance of uncoated soda lime glass, 0.125 inch thick. This material has a non-zero transmittance throughout its measured range. In FIG. 7, the abscissa represents laser wavelength in nanometers and the ordinate represents transmittance and reflectance times 100%. Typical glass materials exhibit cutoff wavelengths slightly beyond 3000 nm. Furthermore, aircraft windows, usually only the cockpit windows, would be made from layers of this glass and the materials hereinbefore mentioned. Also, the passenger windows are most often, if not always, free of glass components. Thus, the net transmission or transmittance would be negligible in all cases. Hence, to operate completely out of the wavelength range, whereby window transmission would be a detriment, the operating wavelengths should be in the mid to upper IR region.

The IR absorption spectra of water and constituents of the deicing materials are shown in FIGS. 8 to 12. In FIGS. 8 to 12, the abscissa represents laser wavenumbers in $cm^{-1}$ and the ordinate represents absorbance. The wavenumber range from 500 to 4000/cm corresponds to a wavelength range from 20 to 2.5 microns, respectively. Superimposed on the wavenumber scale of the abscissa are wavelength values for two lasers that are commercially available and can provide reasonably high power levels, either pulsed or continuous save, CW. The CO and $CO_2$ lasers can radiate at a number of spectral lines over a band of wavelengths.

The absorbance scales are normalized to the peak value over the spectral range. If A($\lambda$) represents the absorbance value, T($\lambda$) represents the transmittance, and $T_o$ represents the normalizing factor, then $$T(\lambda)/T_o = 10^{-A(\lambda)}, \text{ or } \log(T(\lambda)/T_o) = -A(\lambda) \quad (3)$$

Figure 8:
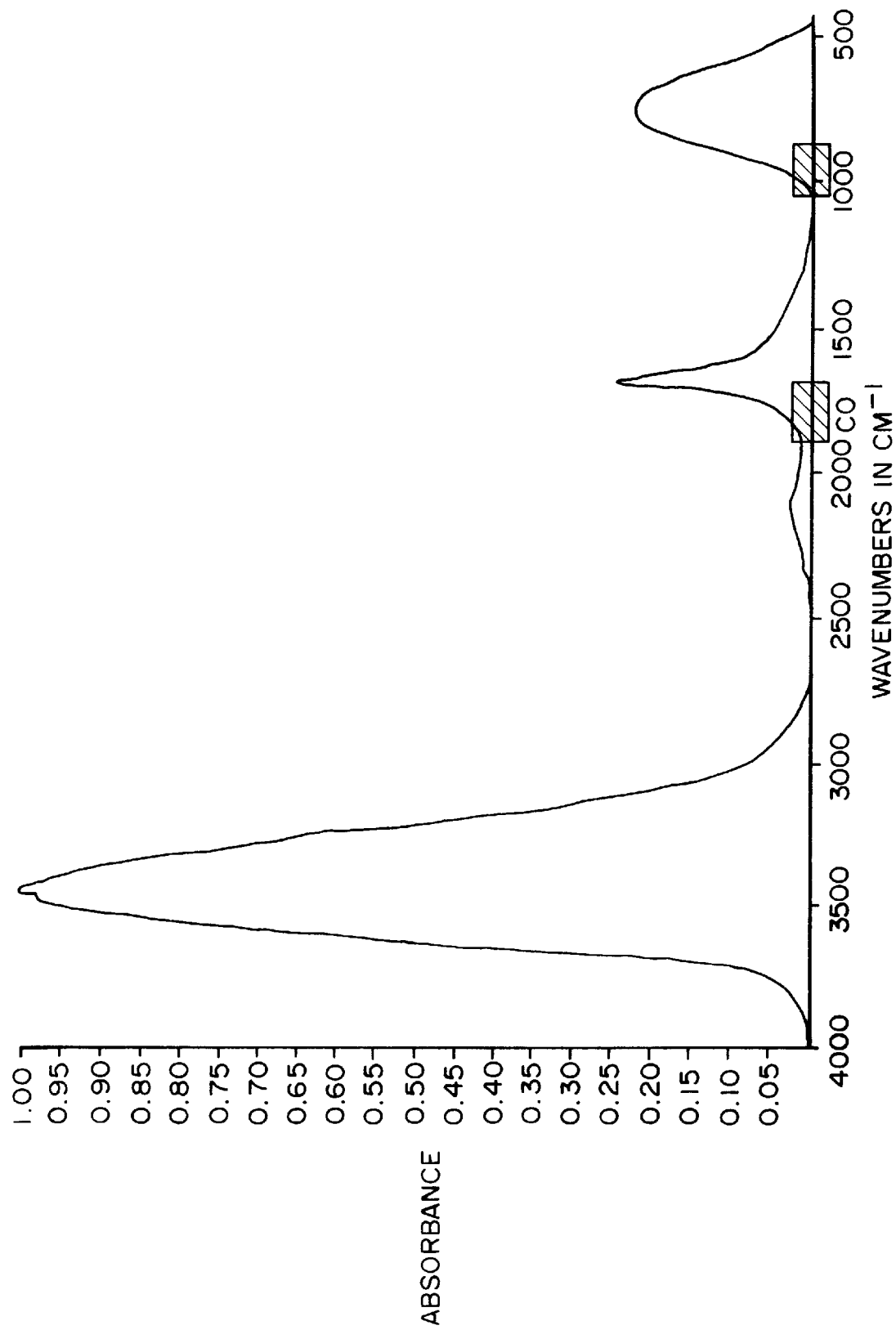
FIG. 8 is a graphical presentation of the IR absorption spectrum of water.
Figure 9:
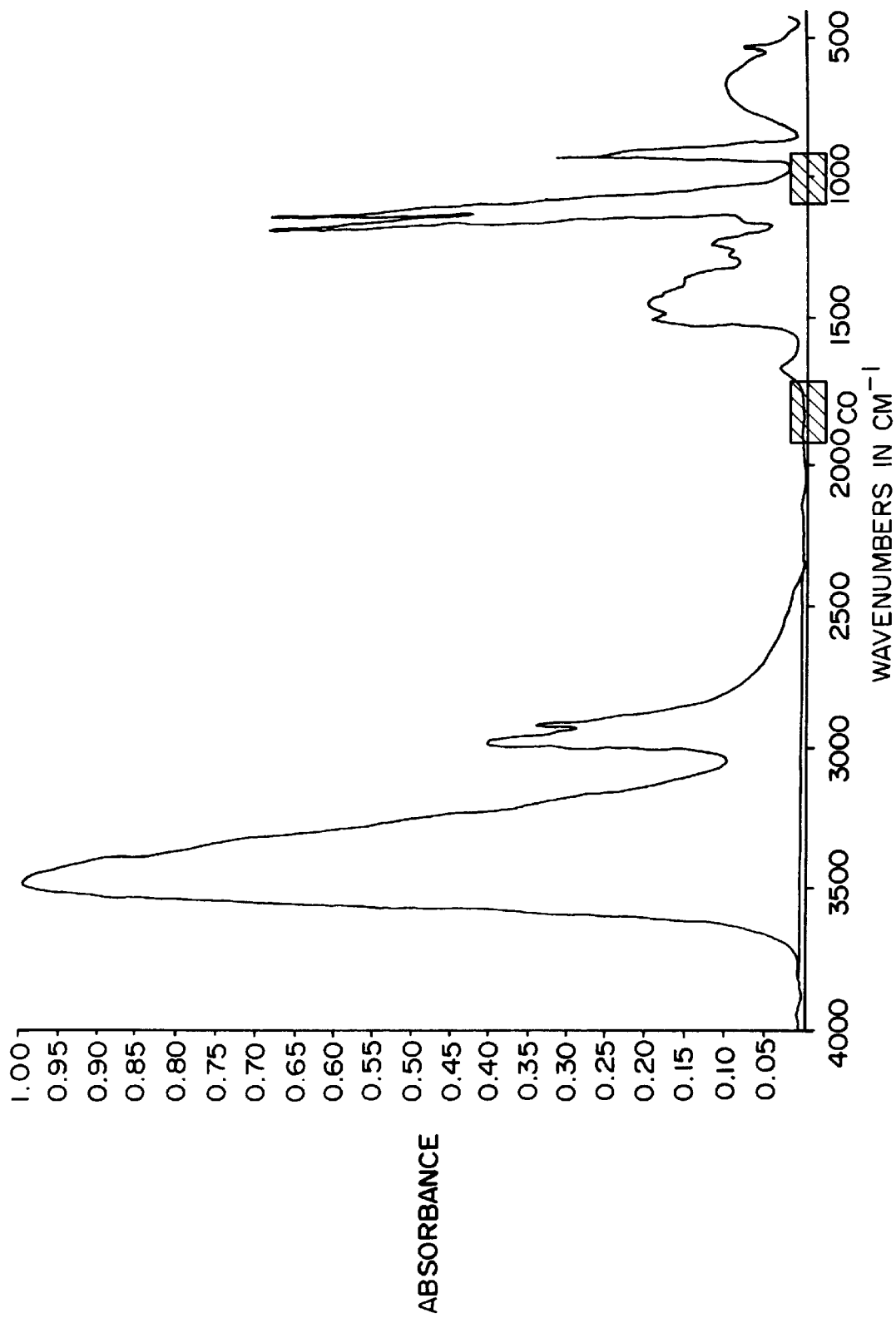
FIG. 9 is a graphical presentation of the IR absorption spectrum of ethylene glycol.
Figure 10:
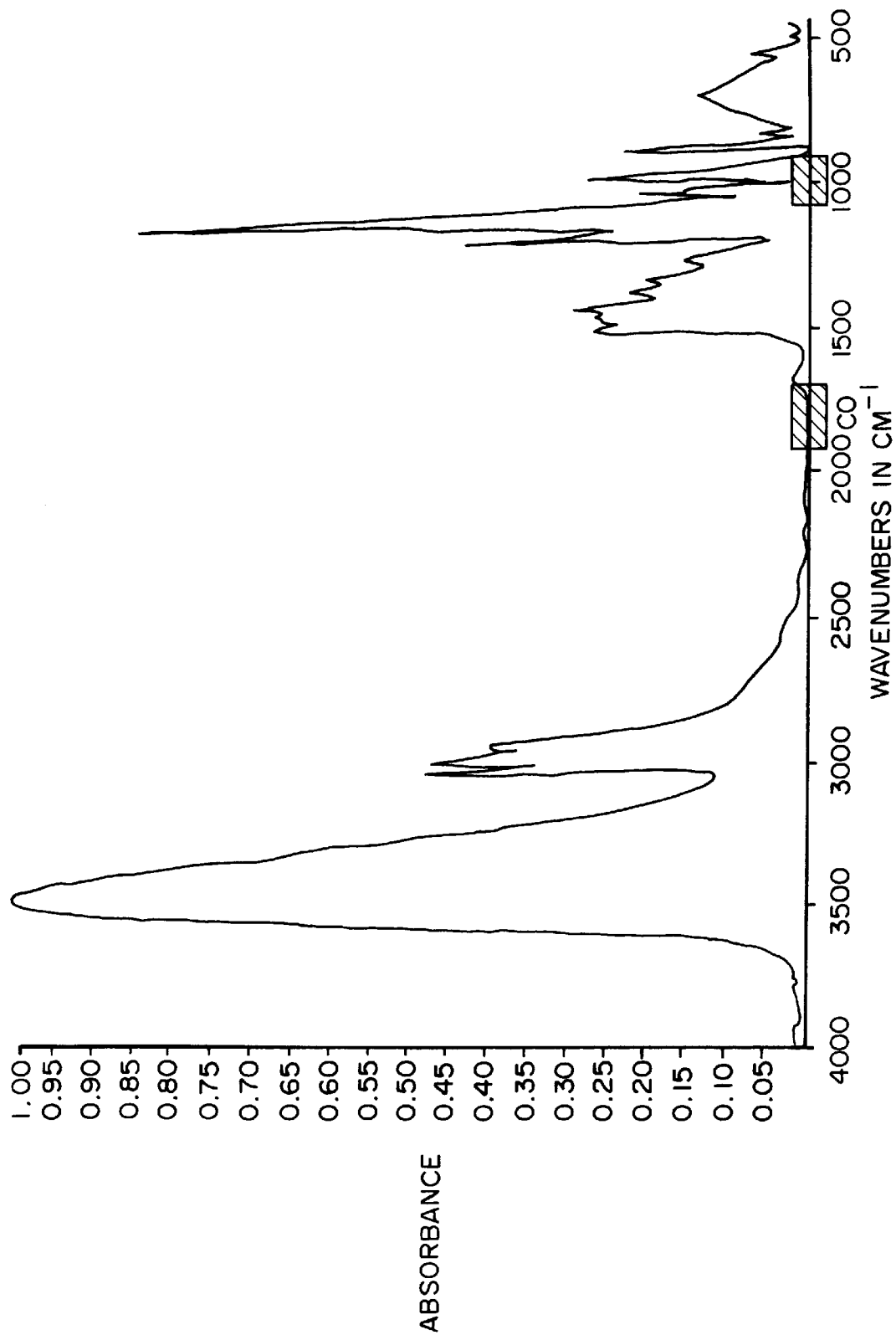
FIG. 10 is a graphical presentation of the IR absorption spectrum of propylene glycol.
Figure 11:
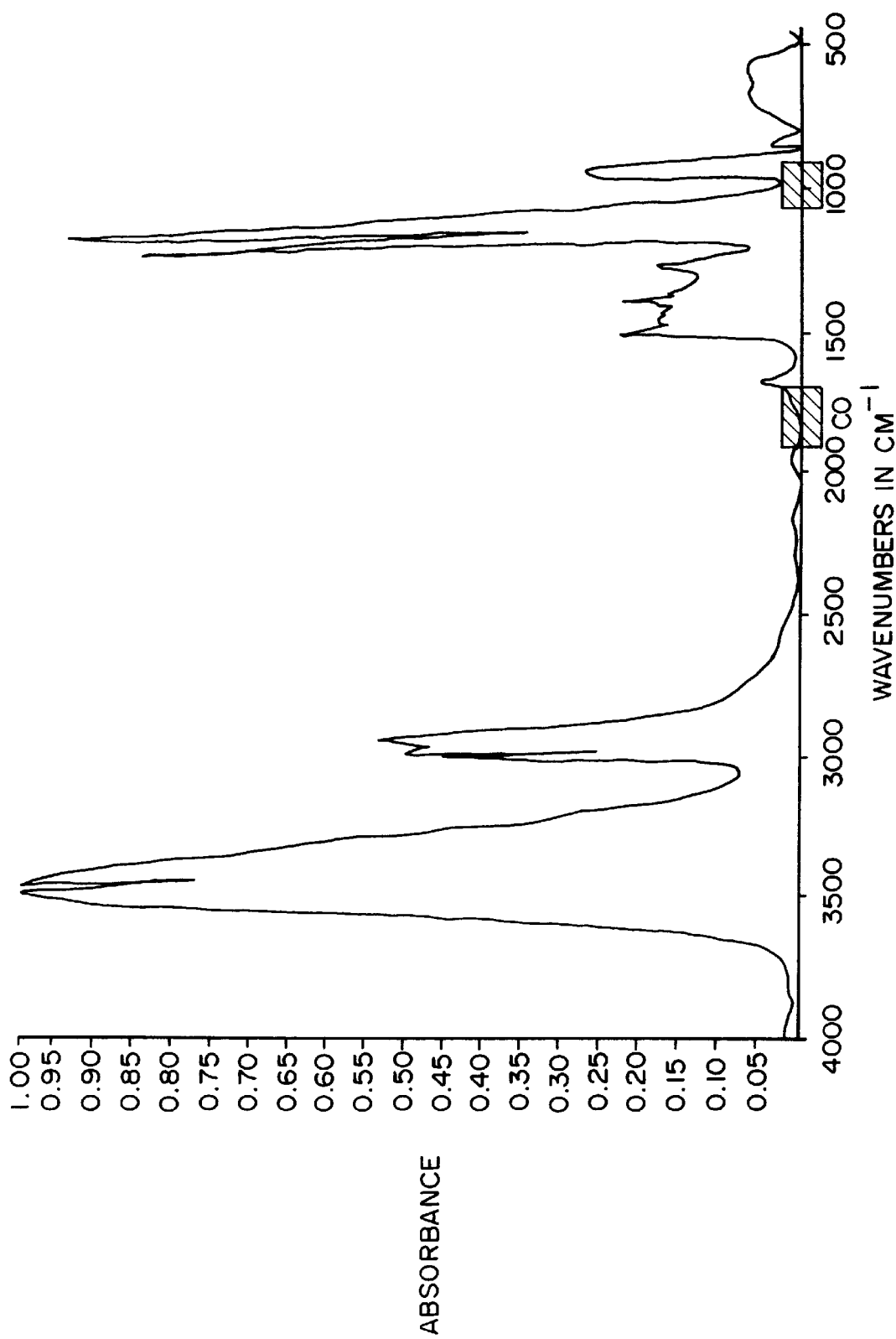
FIG. 11 is a graphical presentation of the IR absorption spectrum of diethylene glycol.
Figure 12:
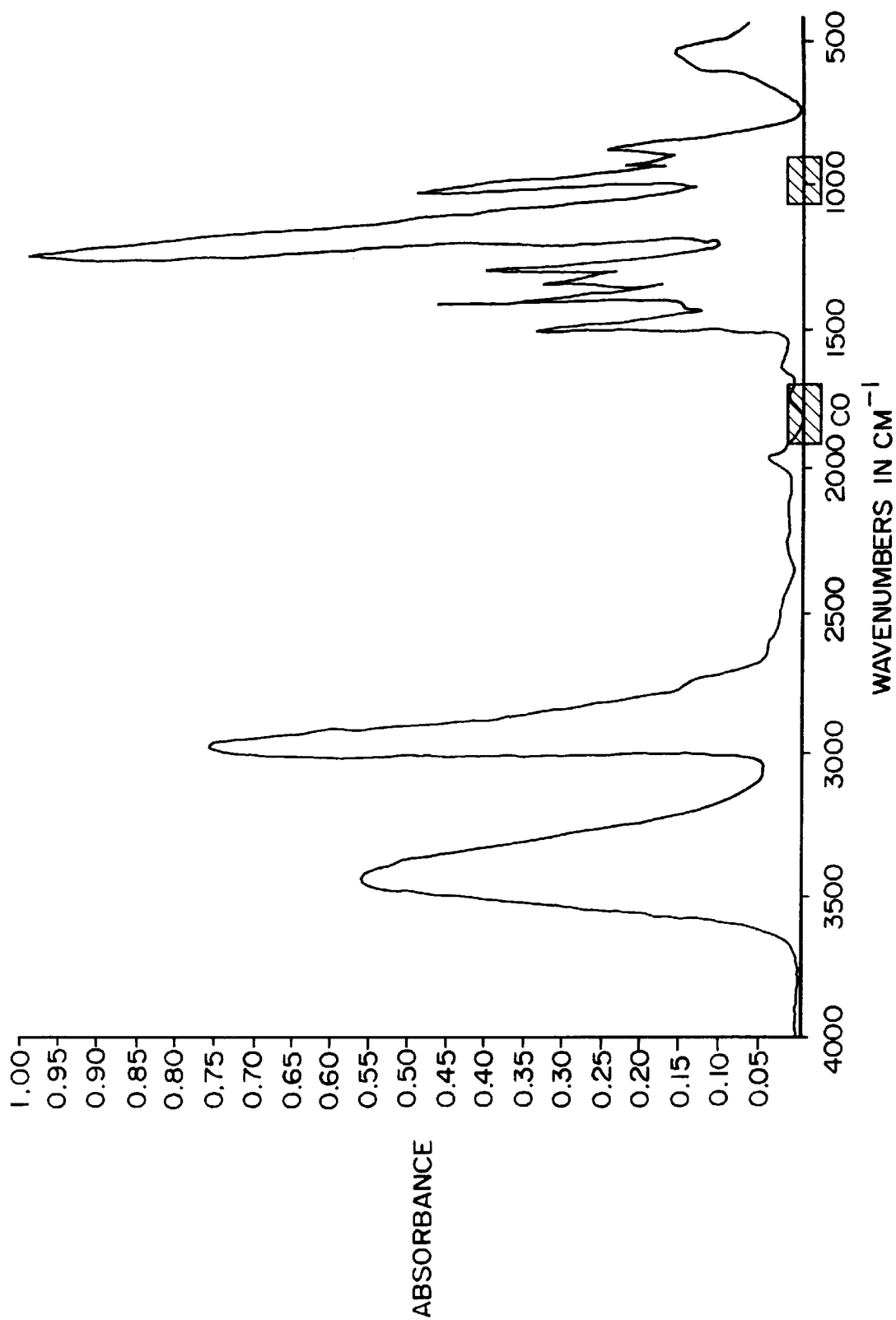
FIG. 12 is a graphical presentation of the IR absorption spectrum of polyethylene glycol.

FIG. 8 shows the absorption spectrum of water. FIGS. 9 to 12 present the spectra for ethylene glycol, respectively. A $CO_2$ laser operating in the vicinity of 9.2 microns is weakly absorbed by water. On the other hand, the absorption for the other materials is relatively high. Thus, this wavelength vicinity would serve as a diagnostic tool to determine the presence of deicing fluid, insensitive to the presence of ice and water. At the CO wavelength in the vicinity of 5.9 microns, the absorption of water is relatively high, whereas, the absorption is low for the deicing fluids. Thus, this wavelength region would be used for determining the presence of ice and water, insensitive to the presence of deicing fluid.

The absorption spectra for the deicing fluids is high at the HeNe wavelength of 3.39 microns compared to that for water. Thus, the operation at this wavelength would establish the presence of deicing fluid on aircraft surfaces.

A single laser source could also be used in this application. For example, as previously described, the $CO_2$ laser radiating at about 9.2 microns is relatively transparent for water, whereas it is highly absorbed for the other fluids. Similarly, operating the CO laser midrange in its emission band, about 5.5 microns, and at about 5.9 microns, will permit discrimination between ice, water and deicing fluids.

The use of lasers mentioned here does not restrict or preclude the use of other appropriate laser choices.

The aircraft ice detecting laser system of the invention can provide information about icing conditions over large areas of an aircraft surface by remote means. Its advantages are eye-safe operation, no physical contact with the aircraft personnel or equipment, and operation and command of the overall system by those with a decision making responsibility, such as the pilot.

While only a preferred embodiment of the present invention has been shown and described, it is to be understood that many changes and modifications may be made thereunto without departing from the spirit and scope of the invention as defined in the appended claims.

I what is claimed:

1. A method of detecting ice on surfaces of an aircraft, comprising the steps of:

generating a continuous wattage laser beam from a laser positioned remotely from the aircraft, the laser beam having a first wavelength absorbed by deicing fluid and a second wavelength absorbed by water and ice;

scanning a surface of the aircraft with the laser beam in a manner whereby said surface scatters said laser beam;

detecting laser light in the first and second wavelengths scattered by said surface with a detector positioned remotely from the aircraft; and processing the detected scattered laser light to reconstruct images of said surface, thereby indicating areas of deicing fluid, ice and water on said surface.

2. A method as claimed in claim 1, further comprising the step of removing radiation outside the wavelength bands of interest prior to detection and after scanning said surface with said laser beam.

3. A method of claimed in claim 1, wherein said processing takes into consideration the directions of scanned laser beams relative to said surface, laser beam geometry factors due to changing distance between the laser beams and said surface while scanning, relative signal levels, normalizations and returns from other detector means.

4. A method as claimed in claim 1, further comprising the step of visually displaying areas of ice on said surface indicated by said processing.

5. A method as claimed in claim 1, wherein said aircraft has windows and further comprising the step of providing the windows of said aircraft with material which blocks said laser beam and any stray laser light.

6. A method as claimed in claim 1, wherein said aircraft has windows and further comprising the step of treating windows of said aircraft to block said laser beam and said laser light.

7. A method of detecting ice on surfaces of an aircraft having windows, said method comprising the steps of generating a continuous wattage laser beam from a laser positioned remotely from the aircraft, the laser beam having a first wavelength absorbed by deicing fluid and a second wavelength absorbed by water and ice, the deicing fluid being selected from a group consisting of ethylene glycol, propylene glycol, diethylene glycol and polyethylene glycol;

scanning a surface of the aircraft with the laser light in a manner whereby said surface scatters said laser light;

removing radiation outside the wavelength bands of interest;

detecting laser light in said first and second wavelengths scattered from said surface with a detector positioned remotely from the aircraft;

processing the detected scattered laser light to reconstruct images of said surface, thereby indicating areas of deicing fluid, ice and water on said surface, said processing taking into consideration the directions of scanned laser beams relative to said surface, laser beam geometry factors due to changing distance between the laser beams and said surface while scanning, relative signal levels, normalizations and returns from other detector means; and visually displaying areas of deicing fluid on said surface based on the detected first wavelength; and visually displaying areas of ice and water on said surface based on the detected second wavelength.

8. A method as claimed in claim 7, further comprising the step of treating the windows of said aircraft with material which blocks said laser light and any stray laser light.

9. A method as claimed in claim 7, further comprising the step of treating the windows of said aircraft to block said laser light.

10. An aircraft ice detecting system for detecting ice on surfaces of an aircraft, said aircraft ice detecting system comprising:

a continuous wattage laser positioned remotely from the aircraft for directing laser light to a surface of an aircraft in a manner whereby said surface scatters said laser light, said laser light having a first wavelength absorbed by deicing fluid and a second wavelength absorbed by ice and water;

a detector positioned remotely from the aircraft for detecting laser light in the first and second wavelengths scattered by said surface; and processing means electrically connected to said detector means for reconstructing images of said surface, thereby indicating areas of deicing fluid, ice and water on said surface.

11. An aircraft ice detecting system as claimed in claim 10, further comprising scanning means interposed between said laser and said aircraft for forming laser beams and scanning said surface.

12. An aircraft ice detecting system as claimed in claim 11, further comprising wavelength filter means interposed between said aircraft and said detector means for removing radiation outside the wavelength bands of interest.

13. An aircraft ice detecting system as claimed in claim 10, wherein said processing means processes output signals of said detector means taking into consideration the directions of the scanned laser beams relative to said surface, laser beam geometry factors due to changing distance between the laser beams and said surface while scanning, relative signal levels, normalizations and returns from other detector means.

14. An aircraft ice detecting system as claimed in claim 10, further comprising visual display means electrically connected to said processing means for visually displaying areas of ice on said surface indicated by said processing means.

15. An aircraft ice detecting system as claimed in claim 10, wherein said aircraft has windows consisting of materials which blocks said laser light.

* * * * *